Patented Dec. 9, 1947

2,432,118

UNITED STATES PATENT OFFICE 2,432,118

CHLOROPHENYL GLYCIDIC ACID ESTER INSECTICIDES

Paul Müller and Walter Schindler, Basel, Switzerland, assignors to J. R. Geigy A. G., Basel, Switzerland, a Swiss firm No Drawing. Application January 26, 1945, Serial No. 574,829. In Switzerland January 7, 1944

7 Claims. (Cl. 167—33)

It is known to produce insecticidal compositions of matter, which contain oxides of hydrocarbon derivatives having more than one double bond. Besides purely aliphatic ethylene oxides, which are partly substituted by alkyl, aryl, halogen, $NH_2$, OH, COOH, CN, S, $AsH_2$, etc., only styroloxide has become known among such oxides having an aromatic radical.

In contradistinction thereto we have now found that insecticidal compositions of matter, which contain an ethylene oxide radical and at least one aromatic radical with the condition that, as far as only one aromatic radical is present, the same must be substituted by halogen and/or alkyl or alkoxy groups respectively, are much more active against insects and their earlier stages of metamorphosis.

The active compounds used according to the invention are partly known. If the same are novel, they are produced according to the methods applicable for the preparation of ethylene oxide derivatives.

According to the present invention it is possible to successfully combat animal pests, especially insects and their earlier stages of metamorphosis, by using the compounds in question in form of pure substance, in solution, emulsion or in powdery form in mixture with other active or inactive substances.

As will hereinafter appear, the claims of this application are directed to those compositions wherein the active insecticidal ingredient is a glycidic acid ester.

The invention is illustrated, but not limited by the following examples, wherein the parts are by weight.

Example 1

By spraying of 10 ccm. of a 5% acetone solution of p-chlorophenyl-ethyl-ethylene oxide per 1 cubic metre in a closed room flies are annihilated within a short time.

Example 2

When bug eggs which are 3 to 5 days old are treated for 2 seconds with a 1% acetone solution of β-(p-chlorophenyl)-glycidic acid ethyl ester, the same are completely killed. If acetone alone is used under the same conditions, no efficacy can be noticed.

The corresponding propyl or butyl esters are also efficacious.

Example 3

10 parts of s-diphenyl-ethylene oxide are thoroughly mixed with 90 parts of talcum and the preparation thus obtained is used as strew agent against injurious insects.

s-Di-(p-chlorophenyl)-ethylene oxide, 4-chlorophenyl-phenyl-ethylene oxide, 4-methylphenyl-4'-chlorophenyl-ethylene oxide, γ-(4-chlorophenoxy)-propylene oxide, γ-(3:4- or 2:4-dichlorophenoxy)-propylene oxide as well as γ-(4-methoxyphenoxy)-propylene oxide react likewise or even better.

Example 4

10 parts of bentonite and 80 parts of calcium carbonate are impregnated with a solution of 10 parts of as-di-(p-chlorophenyl)-ethylene oxide in the required quantity of acetone and then the solvent is removed by distillation. After addition of wetting and adhesive agents a spray agent is obtained which in a 1–5% suspension shows excellent insecticidal properties.

In an analogous manner for example as-ditolyl-ethylene oxide, 4-chloro-3-methylphenyl-4'-chlorophenyl-ethylene oxide, etc., may be used.

Example 5

80 parts of mineral oil are heated with 10 parts of tall oil and with 10 parts of caustic potash lye, until the mixture has become clear. Then the reaction product is treated with 15 parts of the ether obtainable from p-chlorophenyl-trichlorethyl alcohol by boiling the same with dilute caustic soda lye, the said ether having the probable formula

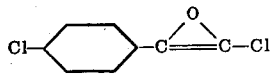

and being dissolved in 75 parts of mineral oil. Thus a solution is obtained which, on dilution with water, yields an excellent insecticidal emulsion.

For the preparation of emulsions also capillary-active ammonium compounds, such as for instance stearyl-p-tolyl-ethyl-methyl-ammonium-methosulfate, may be used.

What we claim is:

1. An insecticidal composition of matter comprising as essential active ingredient β-(p-chlorophenyl)-glycidic acid butyl ester of the formula

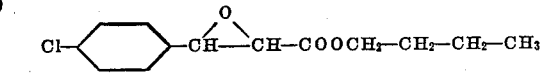

and a carrier therefor.

2. An insecticidal composition of matter comprising as essential active ingredient an ester of the formula

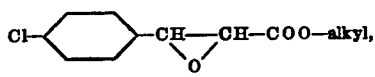

and a carrier therefor.

3. An insecticidal composition of matter comprising as essential active ingredient β-(p-chlorophenyl)-glycidic acid ethyl ester of the formula

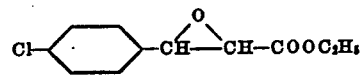

and a carrier therefor.

4. A composition as set forth in claim 2, in which the carrier is a liquid.

5. A composition as set forth in claim 1, in which the carrier is a liquid.

6. A composition as set forth in claim 2, in which the carrier is a solid.

7. A composition as set forth in claim 1, in which the carrier is a solid.

PAUL MÜLLER.
WALTER SCHINDLER.

REFERENCES CITED

The following references are of record in the file of this patent:

UNITED STATES PATENTS

| Number | Name | Date |
|---|---|---|
| 2,348,976 | Hyman | May 16, 1944 |
| 2,221,771 | Alquist et al. | Mar. 19, 1940 |
| 2,221,818 | Slagh et al. | Nov. 19, 1940 |
| 2,152,003 | Van Peski et al. | Mar. 28, 1939 |